US006947944B1

(12) United States Patent
Furuike

(10) Patent No.: US 6,947,944 B1
(45) Date of Patent: Sep. 20, 2005

(54) DATABASE MANAGING APPARATUS AND DATABASE RECORD RETRIEVING APPARATUS

(75) Inventor: Yoshimasa Furuike, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/551,809

(22) Filed: Apr. 18, 2000

(30) Foreign Application Priority Data

Apr. 26, 1999 (JP) .......................................... 11-117951

(51) Int. Cl.[7] .................................................. G06F 7/00

(52) U.S. Cl. ................. 707/101; 707/102.1; 707/104.1; 707/10; 375/240.3; 375/240.21; 375/240.22; 348/390.1; 348/419.1; 382/253; 382/246

(58) Field of Search ............................. 707/101–104.1, 707/205, 1–10; 375/240.03, 240.21, 240.22; 348/390–419, 387.1, 419.1; 382/246, 253

(56) References Cited

U.S. PATENT DOCUMENTS

| | | | | | |
|---|---|---|---|---|---|
| 4,464,650 | A | | 8/1984 | Eastman et al. | |
| 5,109,226 | A | * | 4/1992 | MacLean et al. | 341/95 |
| 5,351,083 | A | * | 9/1994 | Tsukagoshi | 348/384.1 |
| 5,553,277 | A | * | 9/1996 | Hirano et al. | 707/104.1 |
| 5,563,649 | A | * | 10/1996 | Gould et al. | 348/14.13 |
| 5,586,280 | A | * | 12/1996 | Simms | 707/2 |
| 5,596,659 | A | * | 1/1997 | Normile et al. | 382/253 |
| 5,611,024 | A | * | 3/1997 | Campbell et al. | 358/1.15 |
| 5,625,759 | A | * | 4/1997 | Freeman | 358/1.15 |
| 5,668,897 | A | * | 9/1997 | Stolfo | 382/283 |
| 5,748,780 | A | * | 5/1998 | Stolfo | 382/232 |
| 5,778,360 | A | * | 7/1998 | Sugita et al. | 707/4 |
| 5,799,184 | A | * | 8/1998 | Fulton et al. | 707/2 |
| 5,809,295 | A | * | 9/1998 | Straub et al. | 707/1 |
| 5,813,011 | A | * | 9/1998 | Yoshida et al. | 707/101 |

(Continued)

FOREIGN PATENT DOCUMENTS

| | | |
|---|---|---|
| JP | A-61-184052 | 8/1986 |
| JP | 63-296147 | 12/1988 |
| JP | A-4-348617 | 12/1992 |
| JP | A-6-161843 | 6/1994 |
| JP | 6-337762 | 12/1994 |
| JP | A-8-314957 | 11/1996 |
| JP | A-H08-320648 | 12/1996 |
| JP | 10-11338 | 1/1998 |
| JP | A-10-285533 | 10/1998 |

OTHER PUBLICATIONS

Craig T. Albanese & Michael R. Harrison—"Surgical Treatment for Fetal Disease: The State of the Art"—Anals of the New York Academy of Sciences 847—1998 (pps.: 74–85).*

John L. Simpson & Chaman L. Sabharwal—"A Multiple Processor Approach to Data Compression"—Symposium on Applied Computing—ACM—1998 (pp.: 641–649).*

(Continued)

*Primary Examiner*—Jean Corrielus
*Assistant Examiner*—Anh Ly
(74) *Attorney, Agent, or Firm*—Posz Law Group, PLC

(57) ABSTRACT

A database managing apparatus, which can immediately obtain desired data from a database. A database managing apparatus includes a CPU, an input/output device, a main memory and an external memory. The CPU has a controller that initially obtains one article record from stored records via the input/output device. The controller reads out definition data in a database definition file. Then, the controller classifies the obtained records according to attributions based on the definition data. The controller does not compress the data regarding the record group belonging to the attribution A, which is the record group to be searched, but compresses data regarding the record groups belonging to the attributions B–E, which are the record groups other than the record group to be searched. As a result, the controller can reduce the unnecessary decompression of record data belonging to other attributions than the attribution to be searched. As a result, the controller can quickly retrieve the requested record.

14 Claims, 10 Drawing Sheets

U.S. PATENT DOCUMENTS

| | | | | | |
|---|---|---|---|---|---|
| 5,845,226 | A | | 12/1998 | Ajima | 701/208 |
| 5,867,221 | A | * | 2/1999 | Pullen et al. | 375/240.16 |
| 5,901,277 | A | * | 5/1999 | Chu et al. | 358/1.15 |
| 5,991,455 | A | * | 11/1999 | Choo et al. | 382/253 |
| 5,999,936 | A | * | 12/1999 | Pattison et al. | 707/101 |
| 6,035,068 | A | | 3/2000 | Imai | |
| 6,167,084 | A | * | 12/2000 | Wang et al. | 375/240.02 |
| 6,192,154 | B1 | * | 2/2001 | Rajagopalan et al. | 382/232 |
| 6,205,256 | B1 | * | 3/2001 | Chaddha | 382/253 |
| 6,243,081 | B1 | * | 6/2001 | Goris et al. | 345/555 |
| 6,247,015 | B1 | * | 6/2001 | Baumgartner et al. | 707/101 |
| 6,272,180 | B1 | * | 8/2001 | Lei | 375/240.16 |
| 6,356,588 | B1 | * | 3/2002 | Otto | 375/240.03 |
| 6,360,019 | B1 | * | 3/2002 | Chaddha | 382/253 |
| 6,393,149 | B2 | * | 5/2002 | Friederich et al. | 382/173 |
| 6,415,280 | B1 | * | 7/2002 | Farber et al. | 707/2 |
| 6,415,307 | B2 | * | 7/2002 | Jones et al. | 707/525 |
| 6,535,686 | B1 | | 3/2003 | Yanase et al. | |
| 6,539,389 | B1 | * | 3/2003 | Geiner et al. | 707/101 |
| 6,633,609 | B1 | * | 10/2003 | Ing et al. | 375/240.03 |
| 6,816,618 | B1 | * | 11/2004 | Imaizumi et al. | 382/239 |
| 2003/0210825 | A1 | * | 11/2003 | Friederich et al. | 382/246 |

OTHER PUBLICATIONS

Gennady Autoshenkov, David Lomet & James Murray—"Order Preserving String Compression"—Data Engineering, 1996 (Feb. 26, 1996–Mar. 1, 1996) (pp.: 655–663).*

R. M. Lea & E. J. Schuegraf—"An Associative File Store Using Fragments for Run–Time Indexing and Compression"—ACM—1980 (pp.: 280–295).*

* cited by examiner

FIG.4A

| | A | B | C | D | E |
|---|---|---|---|---|---|
| DATA1 | 100 | 211156985 | TOKYOABC__COFFEE | 03-3587-5412 | MINATO-KU,TOKYO |
| DATA2 | 201 | 211579865 | KAGAWAGET__BUGG | 54-8574 | TAKAMATSU-SHI,KAGAWA-PREF. |
| DATA3 | 205 | 211879654 | NAKAMURAUMAE__Corp. | 052-778-5241 | NAGOYA-SHI,AICHI-PREF. |
| | ⋮ | ⋮ | ⋮ | ⋮ | ⋮ |
| DATAm-2 | 864 | 211522365 | CHUKYOUMMKCOPO__TV | 075-845-6523 | KYOTO-SHI,KYOTO-PREF. |
| DATAm-1 | 1000 | 211987654 | IBARAGISHELLGAS | 0725-68-4587 | IBARAGI-SHI,OSAKA-PREF. |
| DATAm | 1054 | 211453285 | RUMOIROWSONSTORE | 66-6842 | RUMOI-SHI,HOKKAIDO |
| | ⋮ | ⋮ | ⋮ | ⋮ | ⋮ |

FIG.4B

| | Ac | Bc | Cc | Dc | Ec |
|---|---|---|---|---|---|
| DATA1 | 100 | 156985 | 04F5D234ED | 7ED32D8 | B674F7542DA532AD |
| DATA2 | 201 | 579865 | 34986FED | 9BC5342 | 4632FD742D5768C0 |
| DATA3 | 205 | 879654 | 9804576 | 5789365 | F358D438F385D581 |
| | ⋮ | ⋮ | ⋮ | ⋮ | ⋮ |
| DATAm-2 | 864 | 522365 | 745FED | 8796845 | 8523DFA6426D032C |
| DATAm-1 | 1000 | 987654 | EA65 | 84E5A65 | 3896F4DE6140F34D |
| DATAm | 1054 | 453285 | 9462984D | 8E68B68 | 542DA642032CF757 |
| | ⋮ | ⋮ | ⋮ | ⋮ | ⋮ |

DATABASE MANAGING APPARATUS AND DATABASE RECORD RETRIEVING APPARATUS

CROSS REFERENCE TO RELATED APPLICATION

This application is based upon Japanese Patent Application No. Hei. 11-117951 filed on Apr. 26, 1999, the contents of which are incorporated herein by reference.

BACKGROUND OF THE INVENTION

1. Field of the Invention

This invention relates to database managing apparatuses and database record retrieving apparatuses, and particular to a database managing apparatus which makes a database file in which compressed requested records are stored and to a database record retrieving apparatus which extracts a requested record from a memory medium in which a database file is stored.

2. Related Art

Recently, databases have been used in, for example, a vehicular navigation system as a map database or a telephone number database for setting a destination. The telephone number database includes several attributions of a shop or a company including: a name, a telephone number, an address, and position data (the longitude, the latitude, the altitude). When a driver of a vehicle inputs a search key such as a telephone number of a shop as a destination, the database is searched. When a record corresponding to the search key exists in the database, the navigation system extracts (retrieves) one article data (each attribution) to which the record belongs, and displays information regarding the one article data or uses as the destination.

Here, since the above-described databases including the map database and the telephone number database are generally stored in one common storing medium such as one CD-ROM, an amount of total data of each database is naturally limited. Therefore, the records to be stored are generally stored in the CD-ROM after being compressed (encoded) so as to reduce a size. When the records are read out from the database to be used in a process, the records are restored (decoded) by being decompressed to a former condition.

Here, in a conventional database managing apparatus, the data is compressed by a unit of record as a whole. Therefore, when the database is searched, it needs to decompress by a unit of the record as a whole before searching the database file. In general, the size of a main memory of the CPU for performing the data compression, the data compression, or the search process, is approximately 10 MB (mega bytes). However, a size of the total records in the database is approximately 100 MB. Therefore, when the CPU performs the search process, the CPU needs to repeat a series of processes including:

(1) loading (reading out) parts of the compressed data from the CD-ROM to the main memory;

(2) decompressing the loaded compressed data to restore it; and (3) searching the restored data.

Hence, it takes long time to complete searching for one article record.

Furthermore, in a relation model database, which has plural attributions for one article, a projection may be performed. The projection retrieves only a particular record having a desired attribution (field). In such a case, it also needs to restore entire records to obtain only the particular record belonging to one attribution.

SUMMARY OF THE INVENTION

This invention has been conceived in view of the background thus far described and its first object is to immediately obtain desired data from a database.

According to the present invention, attribution record group forming means classifies data, which is requested to be stored in a database, according to attributions defined in the database, and makes plural attribution record groups corresponding to each of the attributions. Data compressing means compresses the attribution record groups in a unit of each of the attribution record groups. File forming means combines each of the attribution record groups, which is compressed by the data compressing means, and for forming a database file. As a result, the database managing apparatus can reduce a needless step for decompressing record data belonging to other attributions than the attribution to be searched for. Furthermore, it can retrieve the requested record in a short time.

According to another aspect of the present invention, a data base retrieving apparatus retrieves a target record to be searched from a database file, which is made up of plural attribution record groups (A–E), each of which is compressed in a unit of each of the attribution record groups. Data decompressing means decompresses a particular attribution record group, which is to be searched, when a search request for searching the database file is received. Searching means searches for a target record containing a search key in the particular attribution record group. The data decompressing means further decompresses the other attribution record groups, which are different from the particular attribution record group, when the searching means finds the target record. As a result, the database managing apparatus can unnecessary steps for decompressing record data belonging to other attributions than the attribution to be searched for. Furthermore, it can retrieve the requested record in a short time.

BRIEF DESCRIPTION OF THE DRAWINGS

These and other objects, features and characteristics of the present invention will be appreciated from a study of the following detailed description, the appended claims, and drawings, all of which form parts of this application. In the drawings, like or corresponding portions are identified by like numbers to eliminate redundant explanation. In the drawings:

FIG. 4A is an example of a telephone number database before being compressed;

FIG. 4B is an example of the telephone number database after being compressed;

DESCRIPTION OF THE PREFERRED EMBODIMENTS (First Embodiment)

Hereinafter, a first embodiment in which the present invention is applied to a telephone number database for a vehicular navigation system will be explained with reference to FIGS. 1 to 7.

Figure 1:
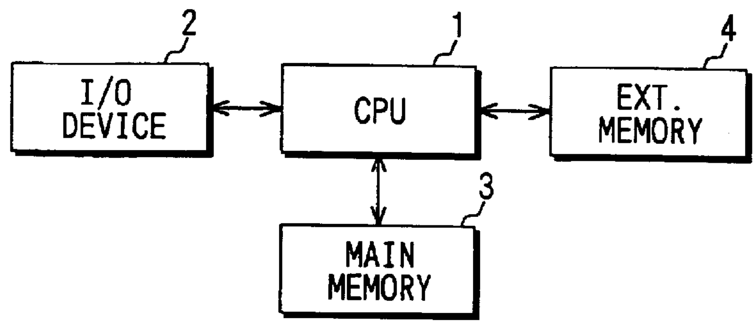
FIG. 1 is a schematic block diagram illustrating a database managing apparatus of a first embodiment according to the present invention.

As shown in FIG. 1, which shows an electrical component of a database managing apparatus, the data base managing apparatus is provided with a central processing unit (CPU) 1; an input/output (I/O) device 2 connected to the CPU 1 and is made up of a keyboard, an input/output data file or the like; a main memory 3 connected to the CPU 1 and is made up of a RAM or the like; and an external memory 4 such as a hard disk unit connected to the CPU 1.

Figure 2:
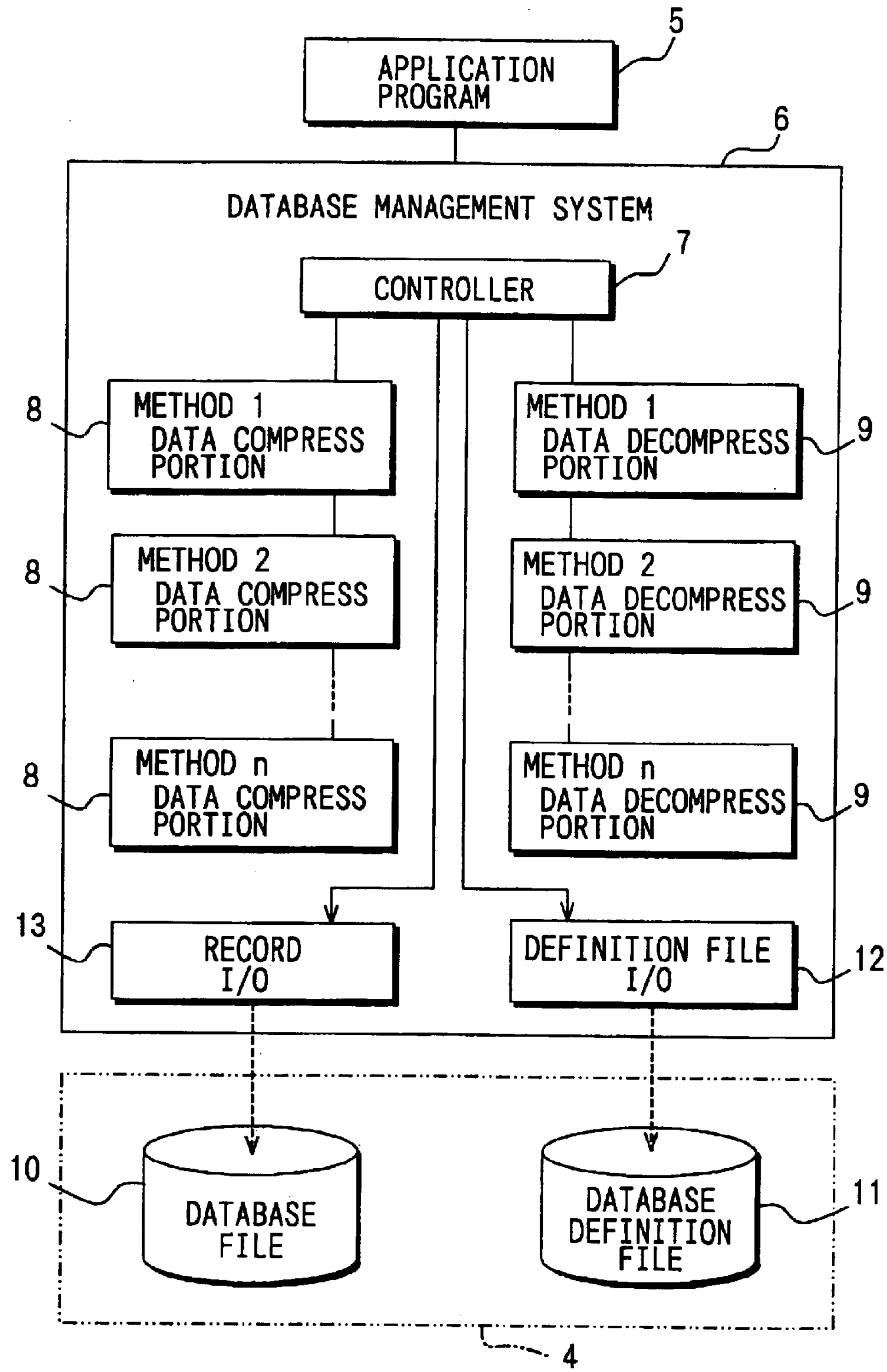
FIG. 2 is a block diagram illustrating each function realized by software.

As shown in FIG. 2, which shows a block diagram illustrating each function realized by CPU 1 by using software, an application program 5 is a data register program for registering a database record to a database. A database management system (DBMS) 6 belongs to the database managing apparatus, and has functions for classifying the records based on attributions, for compressing the data, and for decompressing the data.

A data controller (data compressing means, data decompressing means, searching means) 7 has a function for operating the input/output device 2, and controls a data compression portion (data compressing means) 8 (1, 2, . . . , n) for performing data compression processes (compression methods) and a data decompression portion (data decompressing means) 9 (1, 2, . . . , n) for performing data decompression processes (decompression methods).

A database file 10 and a database definition file 11 are stored in the external memory 4. The database definition file 11 includes several definition data regarding the database file 10, that is, data indicating types of the attributions, or data regarding data compression of each data record having individual attribution. After the data controller 7 reads out definition data in the database definition file 11 via a definition file input/output portion 12, the data controller 7 controls the data compression portion 8 and the data decompression portion 9 to perform the data compression process and the data decompression process in accordance with the read definition data.

The data controller 7 accesses the database file 10 via a record input/output portion 13, so as to store compressed data or to retrieve the stored compressed data. These application program 5, the DBMS 6, the controller 7 etc are stored in the external memory 4. The CPU 1 executes the one of these functions 5–7 by loading onto the main memory 3, if needed.

Figure 3:
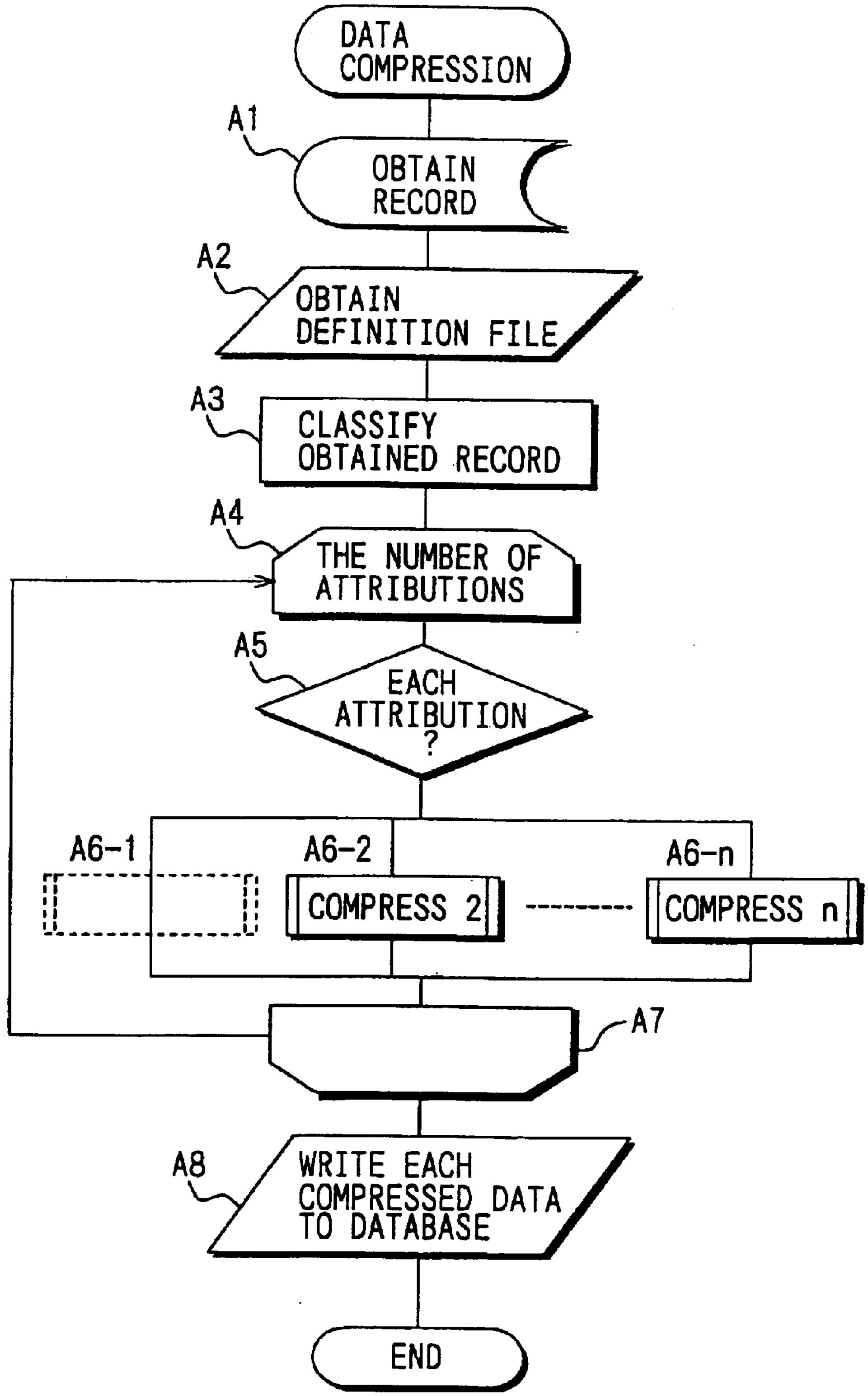
FIG. 3 is a flowchart illustrating a data compression process and a database file forming process.

Next, operations of this embodiment will be explained with reference to FIGS. 3 to 7. FIG. 3 shows a flowchart illustrating the data compression process and the forming process of the database file 10, each of which is executed by the CPU 1, when a record to be stored is provided to the database file 10 via the input/output device 2. FIGS. 4A and 4B show data tables to be stored in the data file 10 as the record. Specifically, FIG. 4A shows the data table before being encoded (compressed), and FIG. 4B shows the data table after being decoded (decompressed). Here, FIG.4B shows data image of the compressed or encoded condition, but does not show a compression result using a special compression method.

In FIG. 3, the controller 7 firstly obtains, for example, one article record from records, which are read by the application program 5 from the input/output device 2 (step A1). The obtained record data is loaded onto a working area provided on the main memory 3. Next, the controller 7 reads out definition data in the database definition file 11 via the definition file input/output portion 12 (step A2). Then, the controller 7 classifies the records obtained at step A1 according to the attributions based on the definition data, and forms attribution record groups (step A3)(attribution record group forming means, attribution record group forming step).

Here, as shown in FIGS. 4A and 4B, in the present embodiment, the attributions of the database include the following attributions A–E (in the case where the number of the attributions n=5).

Attribution A: Article number

Attribution B: Position data

Attribution C: Name

Attribution D: Telephone number

Attribution E: Address

Therefore, in this case, five attribution record groups corresponding to the attributions A–E (see FIGS. 4A and 4B) are formed.

Next, the controller 7 performs a loop of steps A4–A7, so that the data compression portions 8 (1, 2, . . . , n) performs each data compression process according to each attribution record group (steps A5, A6-1, A6-2, . . . , A6-n)(data compression step).

The data compression process is performed by using, for example, a LZ (Lempel-Ziv) slide dictionary method, which is suitable for compressing text data. A summary of the data compression process is as follows.

(1) The controller 7 detects whether an address of a data string, which is the same as the initial two characters of a data string to be compressed, is registered in a data table of a "dictionary" by using a searching method such as a binary search, a B-Tree search, or a hash search. When such an address is not registered, the controller 7 registers its own initial address.

(2) When at least one data string is registered in the dictionary, the controller 7 compares the data string to be compressed with each of the registered data, so as to detect to what order of the character from an initial character does the data string to be compressed match that of each registered data.

(3) When three or more characters are matched as a result of process (2), the controller 7 performs the data compression. In detail, the controller 7 replaces the initial portion of the data string to be compressed with a matching data, which includes an initial address and the number of matched characters (data) of particular data string with which the number of matching is the largest. Furthermore, the controller 7 registers the initial address of this data string to be compressed into the dictionary, and sets a bit, which is provided every plural character and indicates which character in order is not character data On the contrary, when the maximum number of the matching is two or less than two, but is the matching data. the controller 7 does not perform the compression and directly outputs the data to be compressed.

The controller completes the data compression by repeating the above-described processes (1)–(3).

Here, the database definition file 11 also includes data that to which attribution record in the attributions A–E does the record to be used as the search key belongs. In this case, for example, when the record of the attribution A is used as the search key, the record group of the attribution A correspond to the record group to be searched. Therefore, the step A6-1 is a step for compressing the record group of the attribution A, however, the controller 7 does not perform the data compression process (the data compression portion 8(1) is not executed) to immediately perform the search process. In FIG.3,the data compression portion 8(1) is shown by a dotted line.

Regarding the other record group belonging to the attributions B–E, the controller 7 respectively performs the data compression process in steps A6-2, A6-3, . . . , A6-n. In detail, as shown in FIG. 4B, each of the records belonging to the attributions B–E is encoded, so that the data size is reduced. In this figure, each of the attributions of the records after compressing are shown as Ac–Ec (however, Ac is substantially the same as A).

When the data compression process regarding the record group of the attribution E ends at step A6-5, the controller 7 escapes the loop of steps A4–A7, and combines the data compressed according to each attribution record group. After that, the controller 7 writes the combined compressed data into the database file 10 via the definition file input/output portion 13 (step A8) (file forming means, file forming step), and terminates the process.

Here, the database file 10 may be directly formed in the external memory at this stage, or may be formed by the following step. That is, the controller 7 makes the database file 10 on the main memory 3 every time the controller 7 processes one article record, and transfers the database file 10 from the main memory 3 to the external memory 4 after plural processes regarding plural articles of the record have been completed.

When the step A1 is performed only for a part of data that can be loaded from the input/output device 2 to the main memory 3 at one time, and when the data compression process is performed for not all the requested records, the controller 7 returns to step A1 to repeat the same steps, so as to form the telephone number database in the database file 10.

Figure 5:
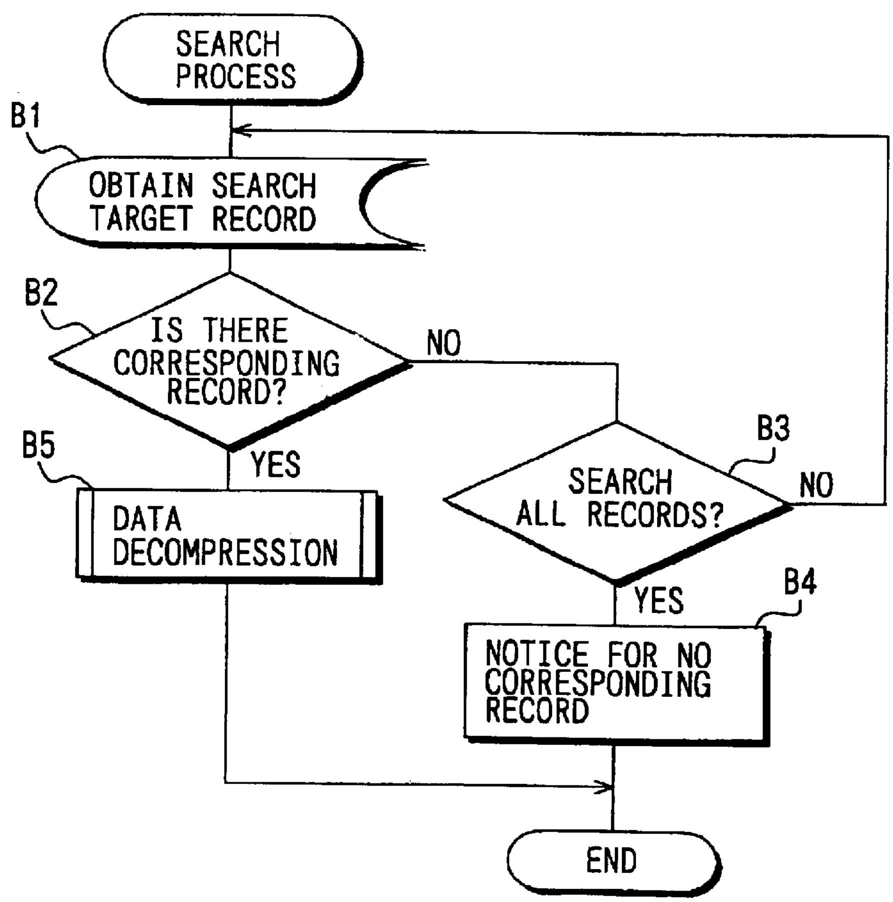
FIG. 5 is a flowchart illustrating a search process.

FIG. 5 shows a flowchart illustrating the search process executed by CPU 1, when there is a search request for a particular record in the database file 10. For example, it assumes that there is a search request for a particular article whose article number is "1000" in FIGS. 4A and 4B. Here, a search key "1000" is inputted via the input/output device 2. In this case, the controller 7 retrieves parts of the record group belonging to the attribution Ac as the record to be searched from the database file 10 to the main memory 3 (step B1). The binary search, the B-Tree search, or the hash search may be used for searching the database file 10. Since the attribution A is not encoded (compressed), the controller 7 immediately performs the search process after receiving the records from the database file 10.

When there is no record corresponding to the search key "1000", the controller determines as "NO" at step B2, and moves to step B3. When the search for all of the records is not ended at that time, the controller 7 determines as "NO", and moves to step B1 to obtain the other record groups in the attribution A.

On the contrary, when the search for all of the records is ended, the controller determines that there is no record corresponding to the search key in the database file 10, and notices for indicating no corresponding record (step B4). The notice may be performed by displaying information that there is no corresponding record, or by using voice sound. Here, the steps B1–B3 correspond to searching means and searching step.

On the contrary, when there is the record corresponding to the search key "1000", the controller 7 determines as "YES", and performs the data decompression process (step B5).

Figure 6:
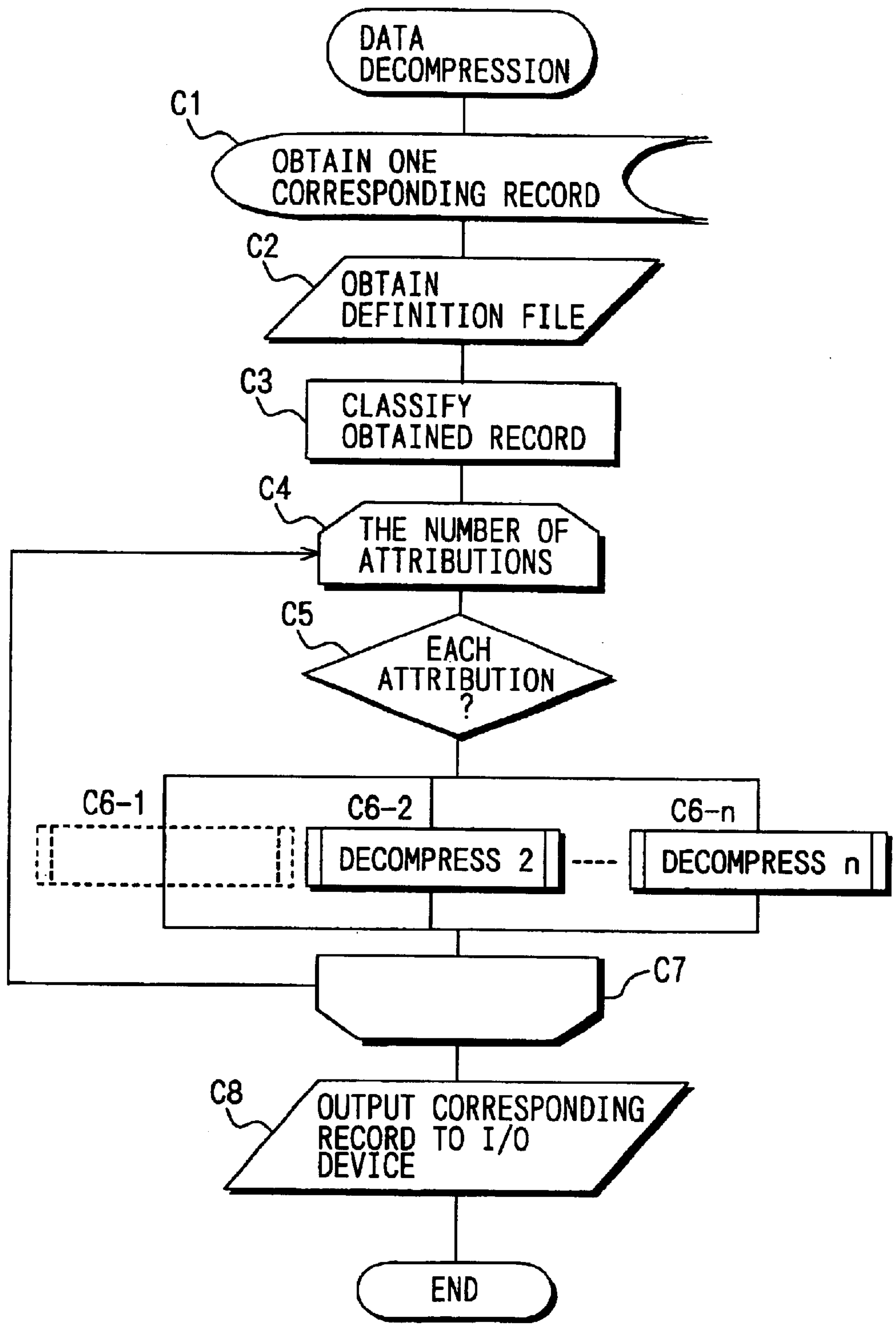
FIG. 6 is a flowchart illustrating a data decompression process.

FIG. 6 shows a flowchart illustrating the data decompression process (data decompressing means, data decompressing step). In this figure, the data controller 7 reads out parts of the record group of the attributions Bc–Ec, which are other parts than the attribution Ac, from the database file 10 to the main memory 3 (step C1).

Here, since an amount of data is large, the data compression process does not compress entire parts of each attribution record group at one time, but compresses each of the attribution record groups by a particular block, which is divided into an adequate amount of data. Therefore, when a certain article record is searched for, the controller 7 searches only the particular block, to which the certain article belongs, in the database file 10.

Next, the controller 7 reads out the definition data in the database definition file 11, in the same way as in step A2 (step C2). The controller 7 classifies the records obtained at step C1 according to the attributions based on the definition data (step C3). Then, while the controller 7 repeats a loop of steps C4–C7, the controller 7 performs the data decompression process for every attribution record group by using the data decompression portion 9 (2, . . . , n) (steps C5, C6-2, . . . , C6-n).

After the data of the record groups belonging to the attributions B–E are restored (decompressed), the controller 7 outputs the article records (attributions A–E) to the input/output device 2, and terminates the process.

Figure 7:
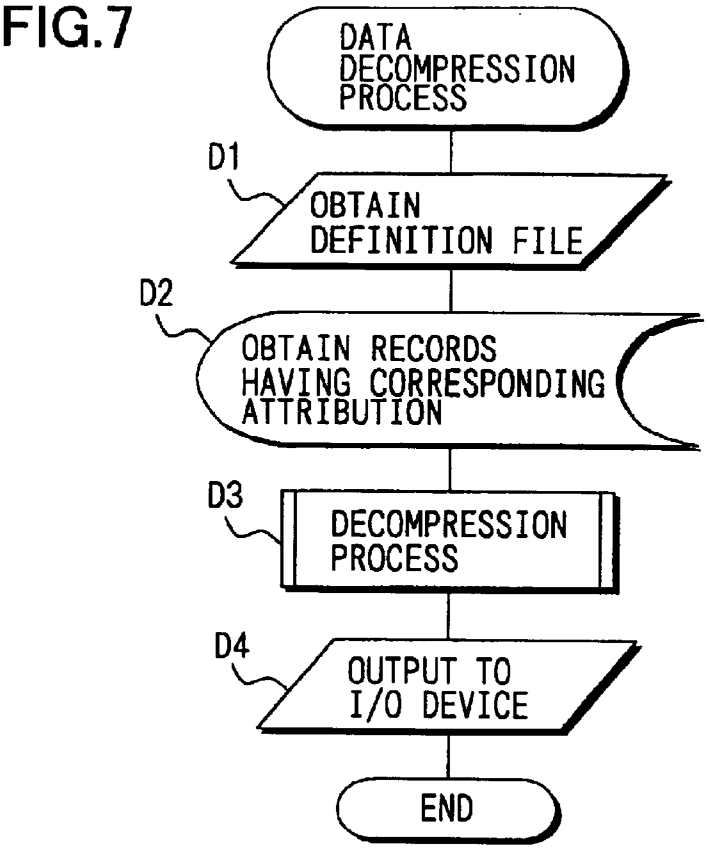
FIG. 7 is a flowchart illustrating a data decompression process when a CPU performs a field retrieve.

FIG. 7 shows a flowchart illustrating the data decompression process (data decompressing means, data decompressing step), when only data belonging to a particular attribution is selectively searched (field search). For example, in a case of the vehicular navigation system, when the destination is set, the names of the shops or companies may be listed on the display and may be selected by moving a cursor or the like. The field search is performed in such a case.

In this figure, when particular attribution data (e.g., attribution C), which is requested for being searched for, is inputted via the input/output device 2, the controller 7 reads out the definition data in the database definition file 11 (step D1). The controller 7 reads out only record group belonging to the attribution Cc, which corresponds to the attribution C and is encoded (compressed), from the database file 10 (step D2). After that, the controller 7 restores the record data regarding the record group belonging to the attribution Cc to the former condition, by using the data decompression portion 9 (3). Then, the controller 7 outputs the restored record data to the input/output device 2.

As described above, according to this embodiment, the controller 7 does not compress the data regarding the record group belonging to the attribution A, which is the record group to be searched, in all of the attributions A–E, but compresses only data regarding the record groups belonging to the attributions B–E, which are the record groups other than the record group to be searched.

Therefore, when there is a search request for a particular record, the controller 7 can immediately start the search process without waiting for the data decompression process for the record group belonging to the attribution A, and can completely perform the search process in a short time. Furthermore, since the record groups belonging to the attributions B–E are decoded (decompressed) only when there is a corresponding record as a result of the search process, it can reduce needless time for performing the data decompression process and can retrieve the requested record. That is, a process time of this embodiment becomes shorter than a conventional system, in which all of the data is decompressed before the search process. In addition, it can prevent the size of the database from increasing by performing the search process in a short time.

Furthermore, the controller 7 reads out and searches only the record group belonging to the attribution A from the database file 10, and reads out and decompresses the other record groups belonging to the attributions B–E only when there is the corresponding record in the database file 10 as a result of the search. Therefore, it can reduce the number of (loads of the data from the external memory to the main memory) times that the database file 10 must be accessed during the search process and during the time necessary to obtain all the requested records, and can reduce the process time.

Furthermore, according to this embodiment, regarding the records belonging to the attributions B–E, the controller 7 respectively compresses data regarding each attribution record group. When the controller 7 selectively searches only the record group belonging to the attribution C, the controller 7 decompresses only the record group belonging to the attribution C. Hence, it does not need to decompress needless record data belonging to other attributions than the attribution to be searched for. As a result, it can retrieve the requested record in a short time.

(Second Embodiment)

Figure 8:
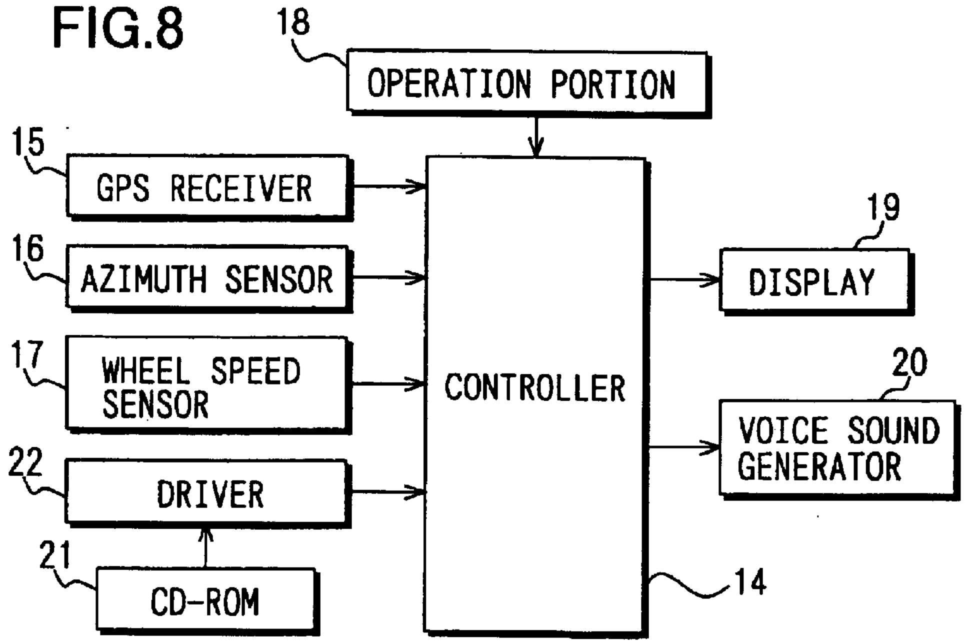
FIG. 8 is a schematic block diagram of a vehicular navigation system of a second embodiment according to the present invention.

FIG. 8 shows a schematic block diagram illustrating an electrical component of a vehicular navigation system (database record retrieving apparatus) of a second embodiment according to the present invention. The vehicular navigation system is provided with a controller (searching means, data decompressing means) 14 made up of a microcomputer or the like, a GPS receiver 15, an azimuth sensor 16, and a wheel speed sensor 17. The GPS receiver 15, the azimuth sensor 16, and the wheel speed sensor 17 are for receiving GPS signals from the GPS satellite and for calculating a present portion of the vehicle. The vehicular navigation system further includes an operation portion 18, which is provided with operation keys with which a user operates to input data, a display unit 19 such as a display, and a voice generation unit 20 such as a speaker.

A database of map data for being displayed on the display unit 19 and the database file 10 of the telephone number database shown in FIG. 4B in the first embodiment. In detail, the database file 10, which is formed by the database managing apparatus in the first embodiment, is written in a CD-ROM 21 by converting a data format to a CD-ROM format. The data in the CD-ROM 21 can be read out to the controller 14 by using a driver 22.

According to the vehicular navigation system of this embodiment, the controller 14 reads out the data stored in the CD-ROM 21, when it is needed, and the controller 14 performs route guidance by displaying the data on the display unit 19 or by using voice sound. The present invention is applied to one function for reading out and decompressing the telephone number database, which is stored in compressed form.

In detail, the program of the data decompression process as shown FIGS. 6 and 7 in the first embodiment is built in a control program of the controller 14. The controller 14 reads out and decompresses the data from the CD-ROM 21 in accordance with an operation of the user via the operation portion 18. As a result, the data decompression process of this embodiment can be performed by the same way as that of the first embodiment.

As described above, according to this embodiment, the controller 14 of the vehicular navigation system reads out and decompresses the data from the CD-ROM 21, in which the database file 10 formed by the database managing apparatus of the first embodiment is stored. Therefore, it can retrieve the requested record in a short time.

(Third Embodiment)

Figure 9:
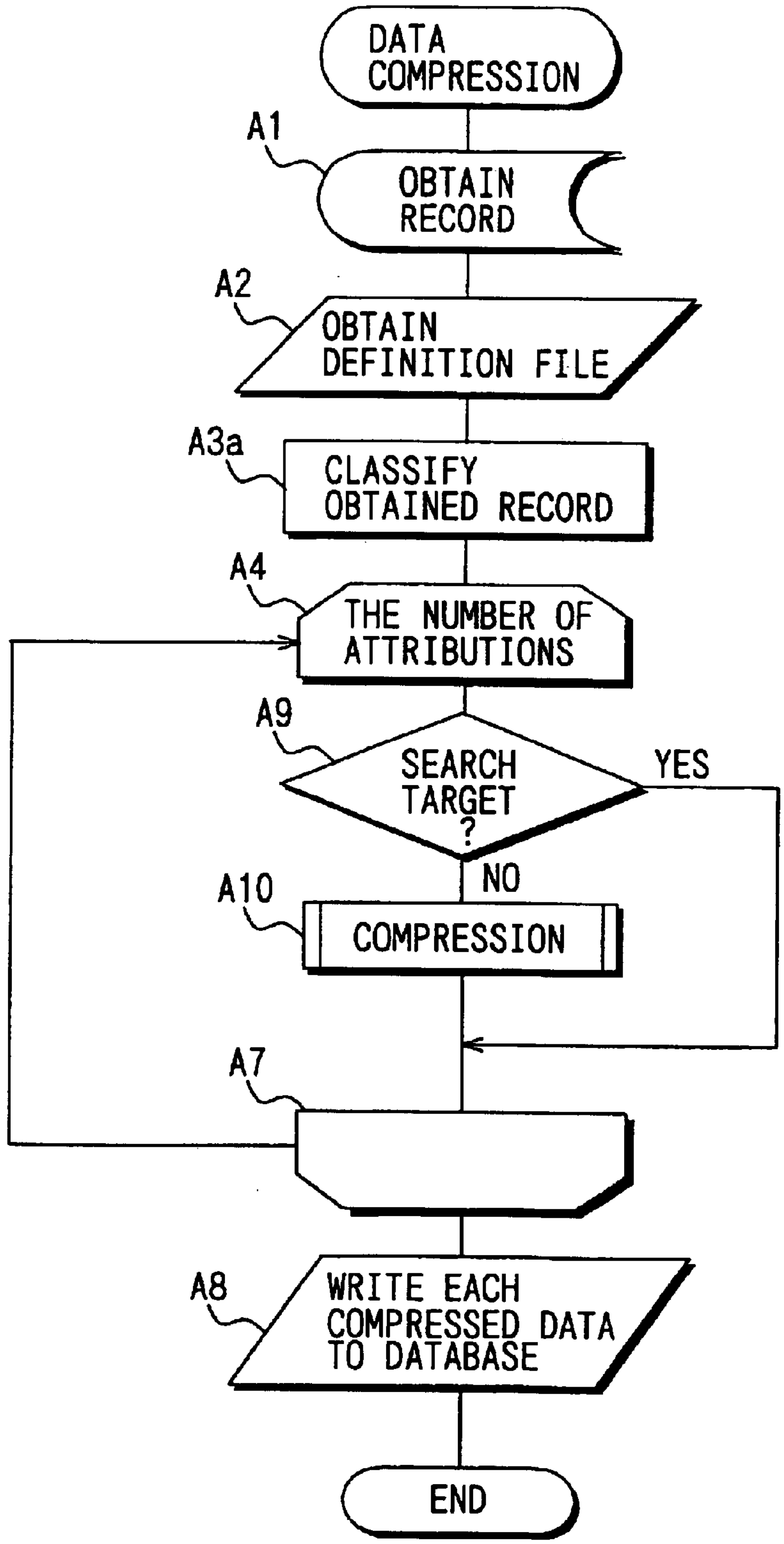
FIG. 9 is a flowchart illustrating a data compression process and a database file forming process of a third embodiment according to the present invention.

FIG. 9 shows a flowchart illustrating a data compression process and a database file forming process of a third embodiment. Differences between this embodiment and the first embodiment will be mainly explained.

In detail, the step A3 in the first embodiment is replaced with step A3*a*. At step A3*a*, the controller 7 classifies the record, which is requested for being stored, into the record group to be searched and the other record groups.

The step A5 is replaced with step A9. At step A9, the controller 7 judges whether the attribution record group is the record group to be searched. When the attribution record group is the record group to be searched, the judgment is "YES", and the controller moves to step A7 without performing the data compression process, as in the first embodiment. On the contrary, when attribution record group is not the group to be searched, the judgment is "NO", and the controller 7 performs the data compression process in a like manner for all the attributions (step 10). Here, the steps A9 and A10 correspond to the data compressing means and the data compressing step.

As described above, when there is a search request for a particular record in the database file 10, the controller 7 performs the search process, and reads out and decompresses the data belonging to the attributions Bc–Ec of the particular record if there is a corresponding record. According to the this embodiment, even when there are many such processes, the controller 7 can perform the data compression process regarding the attributions Bc–Ec as a whole, and therefore the controller 7 can retrieve the data in a short time.

(Fourth Embodiment)

Figure 10:
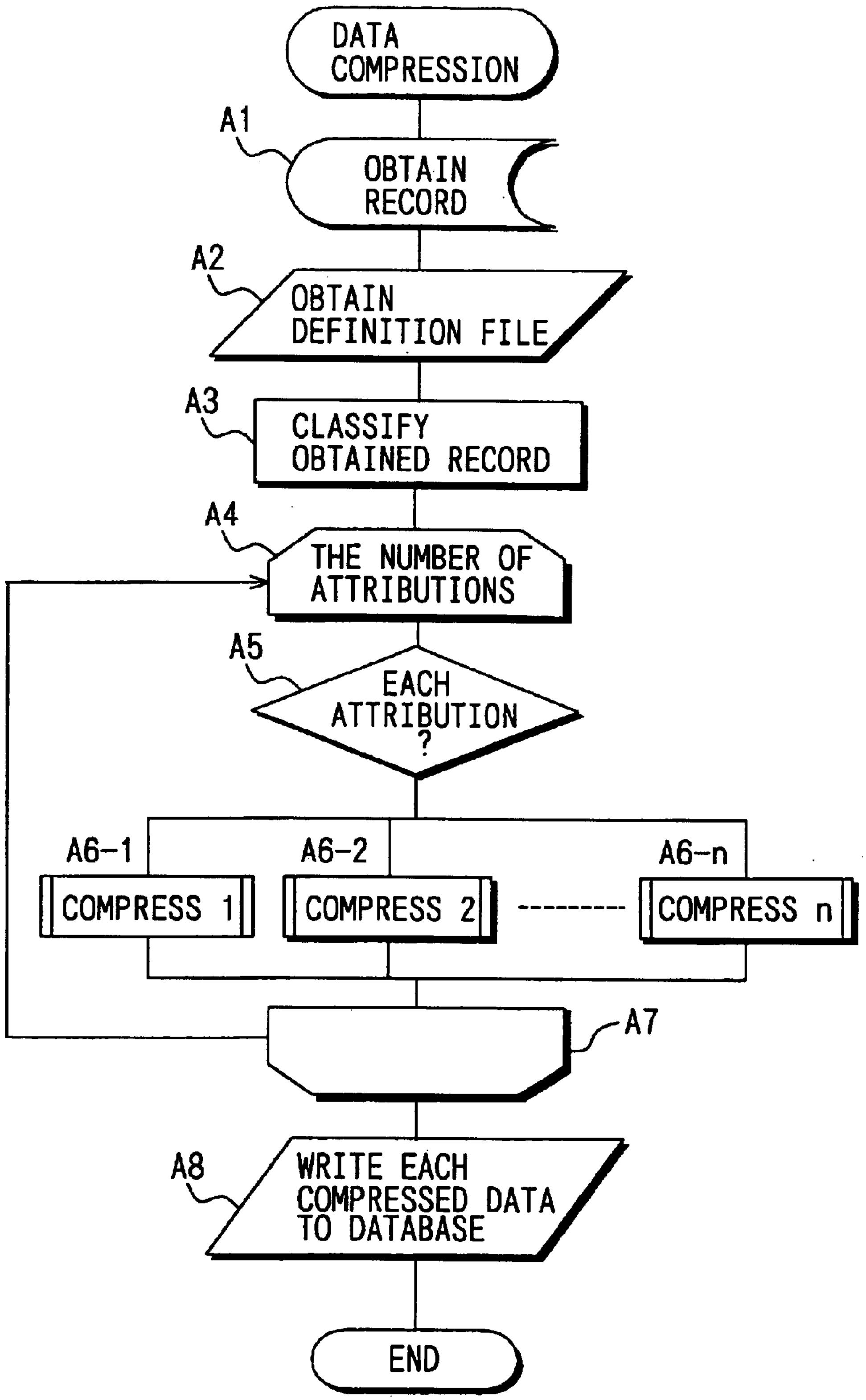
FIG. 10 is a flowchart illustrating a data compress ion process and a database file forming process of a fourth embodiment according to the present invention.
Figure 11:
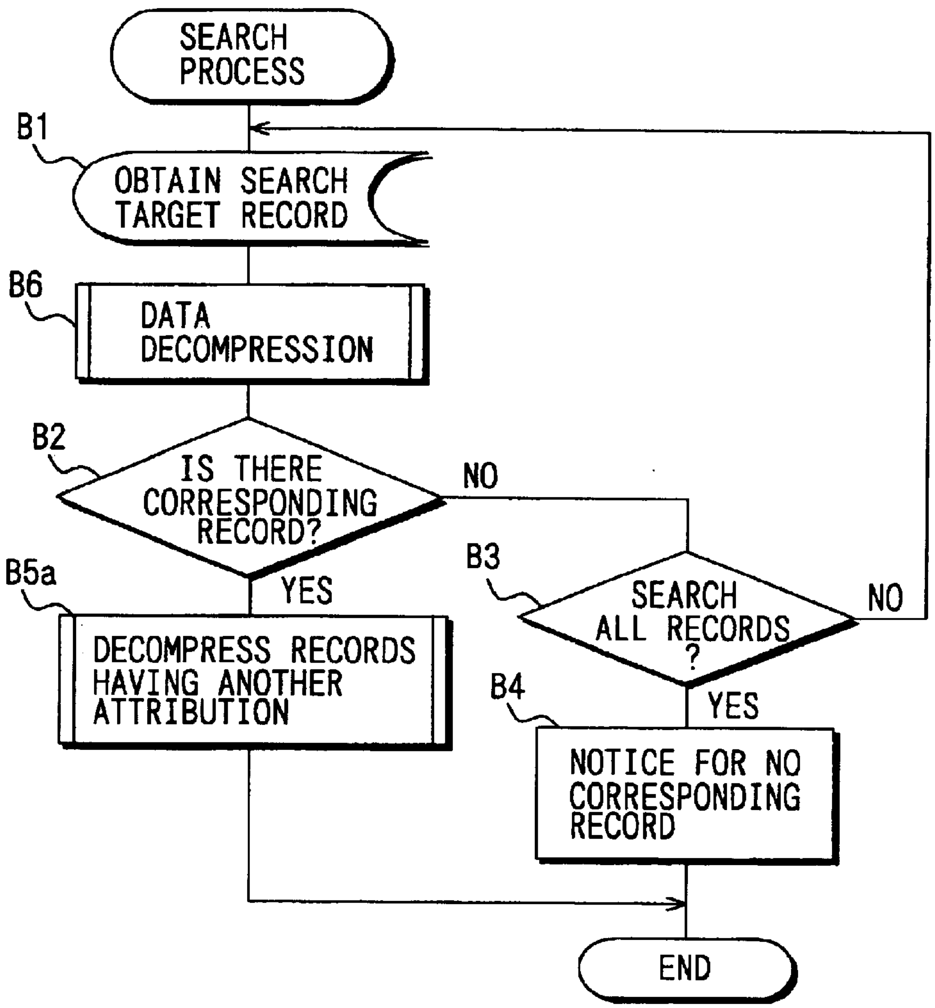
FIG. 11 is a flowchart illustrating a search process of the fourth embodiment.

FIG. 10 is a flowchart illustrating a data compression process and a database file forming process of a fourth embodiment. FIG. 11 is a flowchart illustrating a search process. Differences between this embodiment and the first embodiment will be mainly explained.

In detail, in the first embodiment, the record belonging to the attribution A as the record group to be searched is not compressed. However, in this embodiment, as shown in FIG. 10, the controller 7 also performs the data compression process to the record group belonging to the attribution A at step A6-1 by using the data compression portion 6(1).

In the search process, as shown in FIG. 11, after the controller 7 obtains the data of the record group belonging to the attribution Ac at step B1, the controller 7 performs the data decompression process with respect to the obtained data (step B6). When there is a corresponding record, the controller 7 determined as "YES", and performs the data compression process with respect to the other record groups belonging to the attributions Bc–Ec (step B5a).

As describe above, since the controller 7 also compresses the record group belonging to the attribution A as the record group to be searched, it can reduce total process time compared to the conventional method in which the search process is performed after all of the records are decompressed. Furthermore, since the record group belonging to the attribution A is also compressed, the size of the database file 10 can be reduced.

(Fifth Embodiment)

Figure 12:
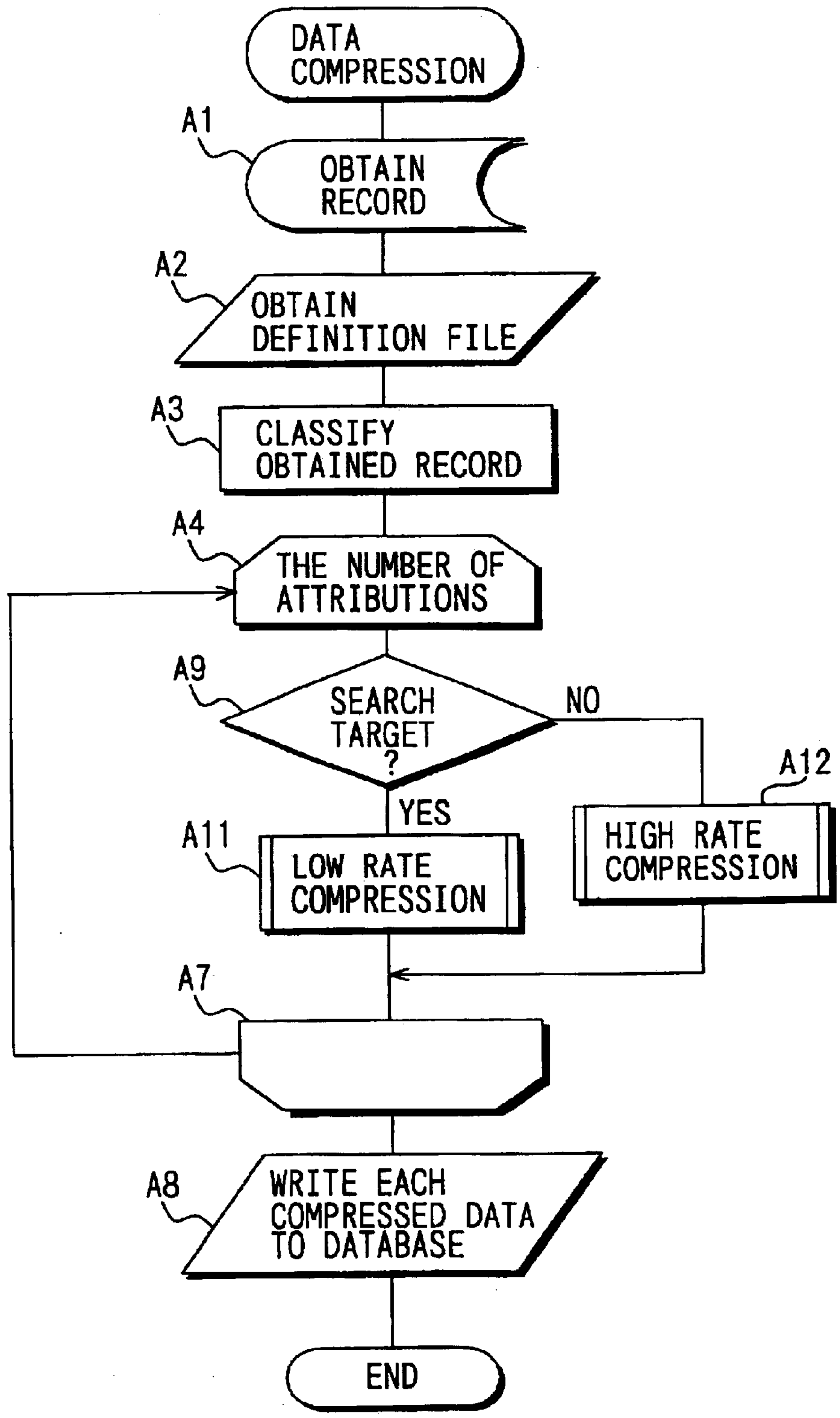
FIG. 12 is a flowchart illustrating a data compression process and a database file forming process of a fifth embodiment according to the present invention.

FIG. 12 shows a flowchart illustrating a data compression process and a database file forming process of a fifth embodiment. Differences between this embodiment and the third embodiment will be mainly explained.

In the third embodiment, when the controller 7 determines as "YES" at step A9, the controller 7 does not perform the data compression process; and when the controller 7 determines as "NO" at step A9, the controller 7 performs the data compression process.

On the contrary, in a fifth embodiment, when the judgment is "YES" at step A9, the controller 7 compresses the record group belonging to the attribution A with a high-speed decompressable format, which is a relatively low compression rate format and can be decompressed in a short time (step A12). When the judgment is "NO" at step A9, the controller 7 compresses the record group belonging to the attribution A with a relatively high decompression rate format (step A12). Here, the steps A9–A11 correspond to the data compressing means and the data compressing step.

As described above, in the data compression process, the "dictionary" is formed for decompressing and restoring the compressed data portion. When a size of the dictionary is set to large, the compression rate can be increased, because a possibility for matching further longer character strings may be increased in the data string to be compressed. On the contrary, when the size of the dictionary is set to small, the compression rate is lowered.

Here, when the compression rate of the data is increased, it takes relatively long time to complete the data decompression process, because a time needed for searching the dictionary during the data decompression process is prolonged. On the contrary, when the compression rate is lowered, the data decompression process can become shorter.

Therefore,the controller 7 restricts the size of the dictionary to small at step A11, so that the compression rate regarding the record group to be searched becomes relatively small, and that the controller can immediately start the search process by reducing the time needed for the data decompression process. On the contrary, the controller 7 sets the size of the dictionary to large at step A12, so as to reduce the size of the other record groups belonging to the other attributions, which are needed only there is a corresponding record in the record to be searched.

As described above, according to this embodiment, since the data compression rate of the record group to be searched is set to small, and that of the other record groups belonging to other attributions is set to high, the controller 7 can perform the search process at high-speed, and can prevent the total size of the compressed data from increasing.

The present invention is not limited to the above-described embodiments, but can be modified and expanded to the following modifications.

The data decompression portion 9 may be omitted from the database managing apparatus of the first embodiment, so that the database managing apparatus mainly includes a function that the database file 10 is formed by performing the data compression process.

When there is no database definition file 11, the controller 7 may classify the attributions of the records to be stored by using a predetermined parameter, and so does the data compression method of each record group belonging to each attribution.

When the controller 7 performs the search process, the controller 7 may load (read out) the data of the other record groups, the other than the record group to be searched, onto the main memory 3.

The database file formed by the data compression method as described in the third to fifth embodiments may be stored in a storing medium such as a CD-ROM, and may be applied to a database record retrieving apparatus such as the vehicular navigation system as shown in the second embodiment, which is provided with the data decompression method corresponding to each of the data compression method.

In the fifth embodiment, the record groups belonging to the other attributions other than the record group to be searched may be compressed regarding each attribution record group, alike the first embodiment.

When there is adequate encode (compression) method for an attribution record group from a viewpoint of a characteristic of each attribution record group, the encode methods may be different from each other.

For example, in the first embodiment, a judgment step for asking the number of the articles is inserted between the steps A3 and A4. The controller 7 repeats the steps A3–A4 until the number of the obtained record articles reaches the number of the articles. When it reaches, the controller 7 determined as "YES" at this inserted step, and performs the data compression process as shown in A4–A7.

When the data string to be compressed has already existed as a file, and when the controller 7 can be obtain plural of article records at the step A1 by reading out the data file regarding each block, the controller 7 may perform the steps A2, A3 and A8 with each block in a lump. Furthermore, when the size of the data string to be compressed is relatively small enough to be read out at one time, each of the steps A2, A3 and A8 may be formed in a lump.

For example, when a particular character string, which is frequently used, such as "corporation" or "co., Ltd" may be expressed by, for example, one byte code, so that a so-called "encode dictionary" is formed by storing the database file 10 in a predetermined region. As a result, the size of the data can be further reduced.

The external memory 4 may be separately formed from the CPU 1, when the external memory 4 is connected to the CPU 1 via a network.

The storing medium is not limited to the CD-ROM 21, but may use a DVD-ROM, an MO disk, a hard disk unit, or a memory card.

The database managing apparatus or the record retrieving apparatus of the present invention is exemplified to the telephone number in the above-described embodiments. However, the present invention may be applied to other apparatus, which searches or retrieves particular data corresponding to particular elements or attributions, such as a bank account managing system, a client database managing system, or sales database managing system.

What is claimed is:

1. A database managing apparatus comprising:

attribution record group forming means for classifying data, which is requested to be stored into a database, according to attributions defined in the database, and for making plural attribution record groups corresponding to each of the attributions, wherein the plural attribution record groups include a search key attribution record group for determining if others of the plural attribution record groups are to be decompressed;

data compressing means for compressing the plural attribution record groups in a unit each of the plural attribution record groups; and file forming means for combining each of the plural attribution record groups, which are compressed by the data compressing means, and for forming a data base file, wherein the data compressing means compresses the search key attribution record group with a first compression method, and compresses the others of the plural attribution record groups, which are different from the search key attribution record group, with a second compression method, the first compression method compresses the search key attribution record group so that the search key attribution record group after being compressed can be decompressed faster than the others of the plural attribution record groups compressed by using the second compression method, and the second compression method compresses the others of the plural attribution record groups so that a compression rate is higher than that of the first compression method.

2. A database managing apparatus according to claim 1, further comprising data decompressing means for decompressing a particular attribution record group, which includes a target record to be retrieved, when a retrieve request for retrieving the target record from the database file is received.

3. A database managing apparatus according to claim 1, wherein the data compressing means further compresses a specific record string, which appears in the plural attribution record groups more frequently than other record strings, to reduce a size of the plural attribution record groups.

4. A database managing apparatus according to claim 1, wherein the database comprises a phone number database used in a navigation system.

5. A database managing apparatus according to claim 1, further comprising data decompressing means for initially decompressing the search key attribution record group prior to the others of the plural attribution record groups in response to a system search request.

6. A database managing apparatus according to claim 5, further comprising report generating means for generating a report indicating when a matching record does not exist in the others of the plural attribution record groups subsequent to the data decompressing means initially decompressing the search key attribution record group.

7. A database managing apparatus according to claim 6, further comprising a display in communication with the report generating means for displaying the report generated by the report generating means.

8. A method of managing database comprising:

an attribution record group forming step for classifying data, which is requested to be stored in a database, according to attributions defined in the database, and for making plural attribution record groups corresponding to each of the attributions, wherein the plural attribution record groups include a search key attribution record group for determining if others of the plural attribution record groups are to be decompressed;

a data compressing step for compressing the plural attribution record groups in a unit of each of the plural attribution record groups; and a file forming step for combining each of the plural attribution record groups, which is compressed by the data compressing step, and for forming a data base file, wherein the data compressing step compresses the search key attribution record group with a first compression method, and compresses others of the plural attribution record groups, which are different from the search key attribution record group with a second compression method, the first compression method compresses the search key attribution record group so that the search key attribution record group after being compressed can be decompressed faster than the others of the plural attribution record groups compressed by using the second compression method, and the second compression method compresses the others of the plural attribution record groups so that a compression rate is higher than that of the first compression method.

9. A method of managing database according to claim 8, further comprising a data decompressing step for decompressing a particular attribution record group, which includes a target record to be retrieved, when a retrieve request for retrieving the target record from the database file is received.

10. A method of managing database according to claim 8, wherein the data compressing step further compresses a specific record string, which appears in the plural attribution record groups more frequently than other record strings, to reduce a size of the plural attribution record groups.

11. A method of managing a database according to claim 8, wherein the file forming step is for forming a phone number database used in a navigation system.

12. A method of managing a database according to claim 8, further comprising a searching step for initially decompressing the search key attribution record group prior to decompressing the others of the plural attribution record groups in response to a system search request.

13. A method of managing a database according to claim 12, further comprising a report generating step for generating a report indicating when a matching record does not exist in the others of the plural attribution record groups subsequent to the searching step.

14. A method of managing a database according to claim 13, further comprising a displaying step for displaying the report generated by the report generating step.

* * * * *